United States Patent [19]

Van Iseghem, Jr.

[11] 3,791,064
[45] Feb. 12, 1974

[54] FISHING LURE
[76] Inventor: Edmond J. Van Iseghem, Jr., c/o Mueller-Perry Co. Inc., 1200 So.,-Florissant Rd., St. Louis, Mo. 63121
[22] Filed: Apr. 10, 1972
[21] Appl. No.: 242,408

[52] U.S. Cl. .................................. 43/26.2
[51] Int. Cl. ............................. A01k 85/06
[58] Field of Search ..................... 43/26.2, 42.38

[56] References Cited
UNITED STATES PATENTS
2,472,505  6/1949  Yocam et al. .................. 43/26.2
638,885   12/1899  Peterson et al. ............... 43/26.2
2,736,123  2/1956  Peterson ...................... 43/42.38

Primary Examiner—Louis G. Mancene
Assistant Examiner—J. Q. Lever

[57] ABSTRACT

This lure includes a body having a propellor driven longitudinal crank shaft which induces oscillating motion into front and rear depending leg elements without positive connection between the legs and shaft. The body includes separable upper and lower portions held together by removable snap rings to facilitate replacement of the legs. The lure can be used to simulate surface active or sub-surface active bait, and in the former case is preferably formed from relatively buoyant materials.

4 Claims, 11 Drawing Figures

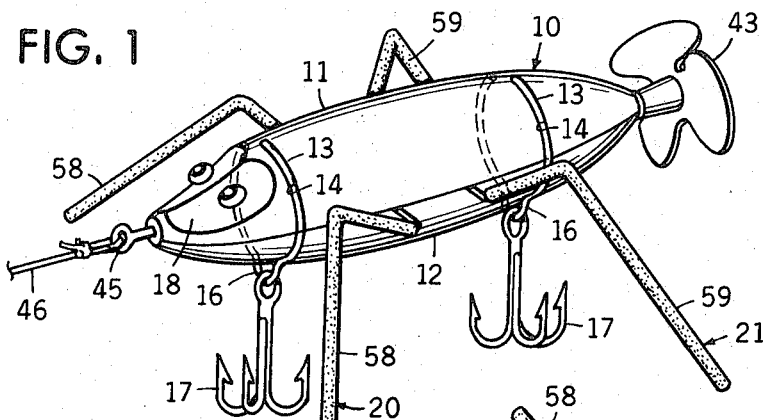
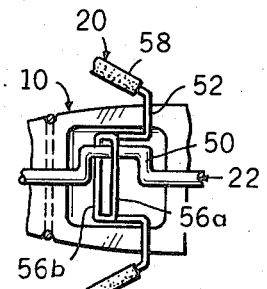
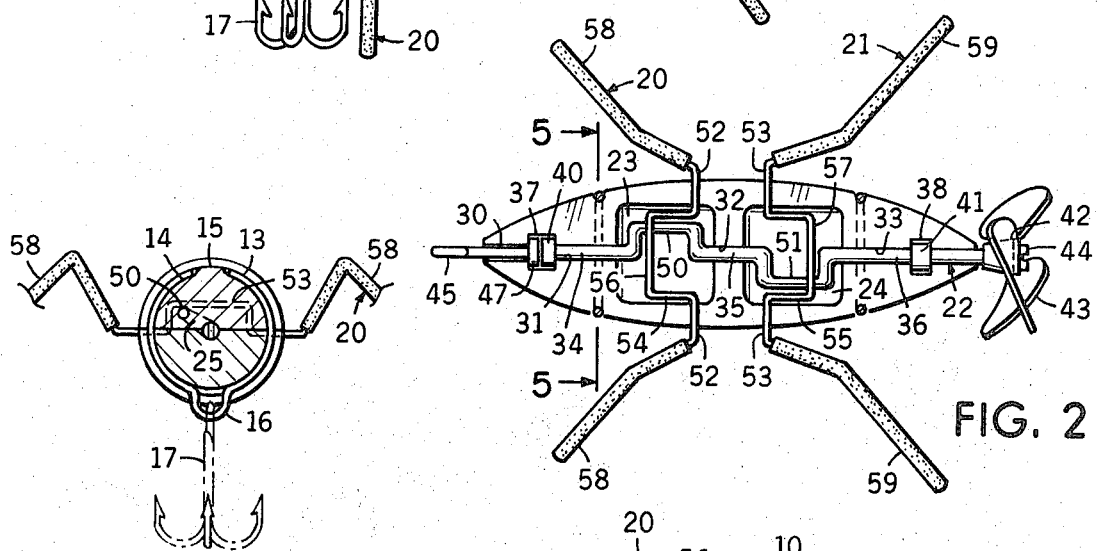
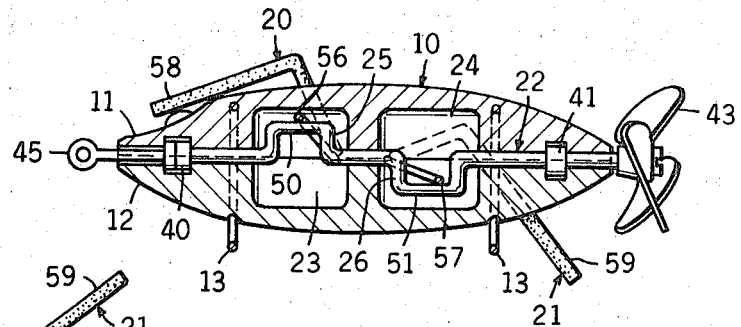
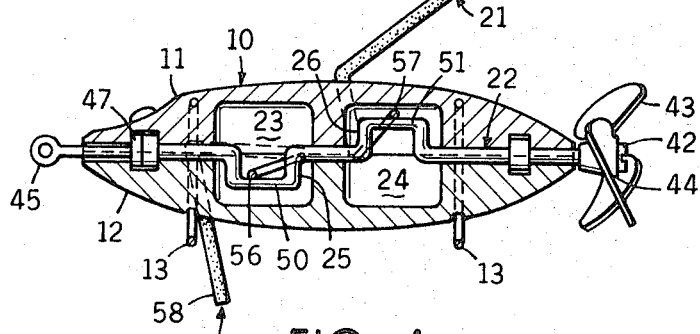

FISHING LURE

BACKGROUND OF THE INVENTION

This invention relates generally to an artificial lure and particularly to a fishing lure which is animated to simulate live bait.

There are a number of fishing lures in the prior art which include moving parts intended to give the appearance of natural bait such as water bugs, small fish or frogs. In some of these, moving parts are actuated by means of a central shaft which passes through the device and which is powered by a propellor. Known lures in the general category referred to above provide moving parts which are positively coupled to the drive shaft in such a manner that wear between the coupled parts is inevitable. Further, they tend to be complicated and hence prohibitively expensive.

It is common to construct lure devices in a permanent form with the result that each device is most suitable for one particular type and size of fish. The moving parts are not accessible once the lure has been assembled and no interchange of legs or other appendages is possible to suit varying seasonal changes.

Although there are many instances in which it is desirable to provide a floating lure to simulate surface active bait, known mechanical lures of the type under discussion tend generally to be operable more than one foot below the surface of the water and usually near the bottom of the lake or stream and are not adaptable to surface use in addition to sub-surface use.

An effective lure which overcomes the deficiencies noted above does not appear to be available.

SUMMARY OF THE INVENTION

This fishing lure includes a body having legs which are animated by means of a central drive shaft that induces motion into the legs without requiring a positive connection between the shaft and the legs.

The upper and lower parts of the body are easily disassembled to permit the legs to be readily changed, the body portions being held together by means of removable snap rings. Substitute legs, having a different covering material or coloring to suit different types of fish, or seasonal changes, can easily be installed.

The body of the lure can be formed from a material of sufficient buoyancy so that the overall weight of the lure permits it to be surface operated. The front and rear legs are arranged to oscillate out of phase to simulate the motion of live bait. The body and legs are not limited to a specific size and shape and various bait may be simulated such as crayfish and frogs, in addition to the bug configuration of the preferred embodiment.

The fishing lure includes a body having opposed ends and a longitudinal drive shaft mounted in journal relation to the body. A transverse shaft, which includes leg elements projecting outwardly of the body is oscillated by rotation of the longitudinal shaft. The longitudinal shaft is driven by a propellor attached outwardly of one end of the body and includes orbiting crank portions spaced along the length of the shaft.

Each transverse shaft includes an intermediate, offset portion engageable by an associated crank portion of the longitudinal shaft for oscillation of the legs. The intermediate offset portion of the transverse shaft is radially spaced from its associated journal axis a distance greater than the orbital radius of the longitudinal shaft crank portions so that said crank portions can orbit without binding. The outwardly extending legs are angularly related to the transverse shaft and have their center of gravity offset from the journal axis in the same general direction as the intermediate portion of the transverse shaft so that the intermediate portion is urged downwardly by said legs. In order to induce oscillating motion into the legs in a downward direction as well as an upward direction the intermediate offset portion is formed in an elongate loop which includes parallel upper and lower elements sequentially engageable by an associated orbiting crank portion of the shaft.

When the lure is to be used to simulate surface active bait the body is formed from a plastic material having a relative density sufficient to ensure buoyancy of the lure and said upper and lower body portions are held together by a pair of longitudinally spaced snap rings. Each snap ring is removable upon the application of sufficient force to the hook depending therefrom and the other snap ring is capable of holding the body together in the event of such removal.

The crank portions of the longitudinal shaft are oppositely disposed of each other and the leg elements are forwardly and rearwardly disposed in mirror image of each other so that the legs oscillate and move upwardly and downwardly in opposite directions as the longitudinal shaft is rotated by the propellor.

BRIEF DESCRIPTION OF THE DRAWING

FIG. 1 is a perspective view of the fishing lure;

FIG. 2 is a plan view of the lure in cross section;

FIG. 3 is a longitudinal view in cross section illustrating the lure with the legs in one position;

FIG. 4 is a similar view illustrating the legs in a different position;

FIG. 5 is a view taken in cross section along line 5—5 of FIG. 2;

FIG. 6 is a detail illustrating a modified leg construction;

DESCRIPTION OF THE PREFERRED EMBODIMENTS

Figure 7:
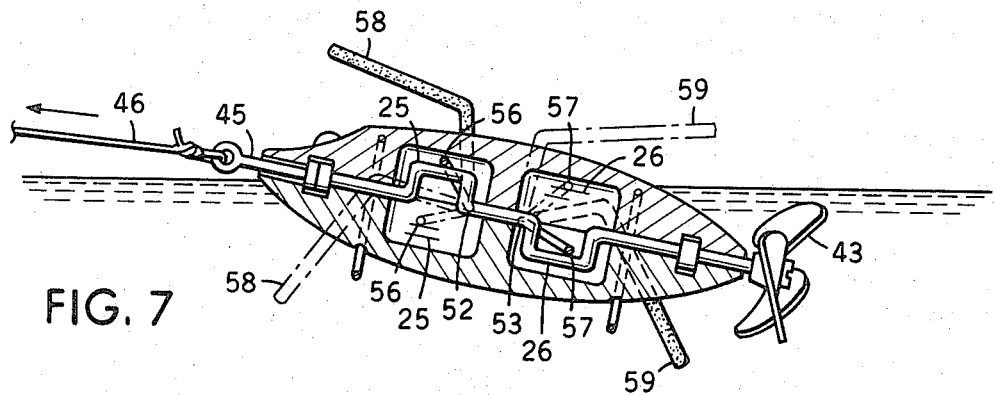
FIG. 7 is a longitudinal view illustrating the disposition of the lure when used as a surface active bait.

Referring now by characters of reference to the drawing and first to FIG. 1 it will be understood that the lure includes a body 10 having upper and lower portions 11 and 12 interconnected by means of snap rings 13 accommodated within compatible grooves 14 at the front and rear end of the lure respectively. Except for the simulated head portion 18, the body 10 is substantially lengthwise symmetrical and the snap rings 13 are interchangeable. As shown in FIG. 5 the snap ring grooves 14 are circumferentially incomplete and the ends thereof are separated by a stop portion 15, which serves to ensure that the snap rings are correctly oriented. Each snap ring 13 includes a loop portion 16 suitable for accommodating a conventional hook 17. The lure includes forward and rearward leg means 20 and 21 respectively, which are actuated into an animated condition by means of a crank shaft generally shown by numeral 22 in FIG. 2 and constituting longitudinal shaft means.

It will be understood that the upper and lower portions of the body 10 are generally similar and that the body includes a pair of forward and rearward cavities indicated by numerals 23 and 24, each cavity accommodating an associated crank portion 25 and 26 respectively of the crank shaft 22. The crank shaft 22 is journal mounted within a compatible body groove 30 which includes forward, intermediate and rearward axial portions 31, 32 and 33 respectively accommodating compatible axially aligned shaft portions 34, 35 and 36. The crank shaft 22 is journal mounted within said groove 30, which includes forward and rearward enlarged recess portions 37 and 38 accommodating crank shaft collar portions 40 and 41, which facilitate the journal mounting and preclude longitudinal movement of the rhaft 22 relative to the body 10. The remote rear end of the shaft 22 includes an enlarged portion 42 to which a propellor 43 is mounted by means of a screw 44.

A pull element, generally indicated by numeral 45, is provided at the forward end of the body 10 to which may be attached a finishing line 46 so that the lure may be pulled forward. The pull element 45 includes an enlarged portion 47, which is accommodated within the enlarged forward recess 37, independently of the shaft 22 so that rt does not rotate with said shaft.

The shaft crank portions 25 and 26 are substantially U-shaped and are angularly related to each other as indicated in FIG. 2. The U-shaped crank portions 25 and 26 provide orbitable offset bight portions 50 and 51 respectively engaging the leg means 20 and 21, said leg means constituting transverse shaft means. The front and rear leg means 20 and 21 are substantially identical in construction but are assembled in mirror image of each other which permits interchangeability of said leg means.

Figure 8:
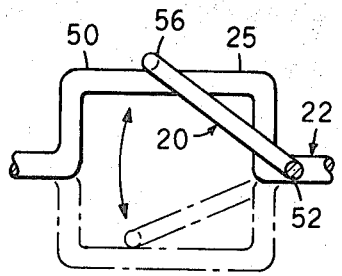
FIG. 8 is an enlarged detail illustrating engaging portions of the shaft and legs of the species of FIGS. 1–5.
Figure 9:
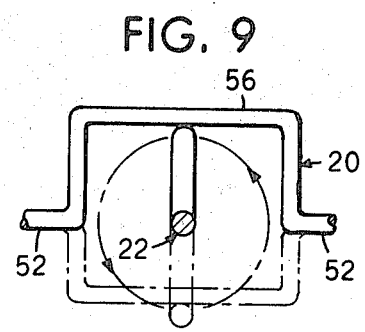
FIG. 9 is an end view of said engaging portions.

The front leg means 20 includes journal mounted portions 52 interconnected by a U-shaped crank portion 54 providing an intermediate offset portion 56. Opposed, outwardly extending end portions 58 are angularly related to the journal axis and are bent into a downwardly depending configuration. As shown with particularity in FIGS. 8 and 9 the intermediate offset portion 56 of the front leg means 20 is spaced from its associated journal axis a distance greater than the cranked orbiting portion 50 of the shaft 22. The result of this is that as the shaft 22 rotates, the intermediate offset portion 56 is raised by engagement with the associated crank shaft orbiting portion 50. The intermediate offset portion 56 can be moved upwardly from the longitudinal axis of rotation a distance greater than the engagement radius of the shaft crank portion 50 and therefore there is no binding between said portions as the shaft 22 rotates continuously.

Because the center of gravity of the leg means 20 is offset from the journal axis in the same direction as the intermediate offset portion 56, said intermediate portion is urged downwardly until again raised by the shaft 22. The end portions 58 of the leg means 20 therefore move up and down as the shaft 22 rotates and oscillates the intermediate offset portion 56. The structural arrangement of parts of the rear leg means 21 is substantially similar to that of the front leg means and includes journal portions 53 interconnected by a crank portion 55 providing an intermediate offset portion 57. Because the crank shaft portion 26 is oppositely disposed of the crank shaft portion 25 the orbiting crank shaft portion 51 produces oscillating motion of the end portions 59 in the reverse direction to that of the end portions 58 as indicated in FIGS. 3 and 4 respectively.

It will be importantly observed that there is no direct, positive connection between the crank portions of the shaft 22 and the crank portions of the leg means 20 and 21 respectively.

FIG. 6 illustrates a modification in which the intermediate offset portion 56 is provided by a pair of elements 56a and 56b which are in substantially the same plane but are disposed above and below the orbiting crank shaft offset portion 50, substantially equidistant from the transverse journal axis. As shown with particularity in FIGS. 10 and 11, the element 56a performs essentially the same function as the element 56 in the first embodiment. The substantially parallel element 56b, on the other hand, provides a means by which the orbiting crank shaft offset portion 50 urges the leg means 20 downwardly by engagement of element 56b with said shaft offset portion 50 rather than being urged downwardly as a result of the weight distribution of the leg means 20. Each of the elements 56a and 56b is disposed from the transverse journal axis a distance greater than the orbital radius of the associated orbiting portion 50. Elements 56a and 56b, in effect, cooperate to form an elongate open loop receiving said orbiting portion 50.

It is thought that the structural features and the functional advantages of this fishing lure have become fully apparent from the foregoing description of parts but for completeness of disclosure the operation of the device will be briefly summarized.

In one preferred embodiment, illustrated in FIGS. 1–5, the lure includes a body 10 of a plastic material such as polypropylene which provides it with inherent buoyancy. FIG. 7 illustrates the embodiment of FIGS. 1–5 used as a top water lure and disposed in floating relation to the water level. The weight distribution of the various elements, and in particular the propellor 43, determines the balance of the lure, and is such that the rearward portion of the lure is lower than the forward portion which provides that the propellor is fully submerged at all times. It has been found that good results are obtained when the propellor is completely submerged to a point about one-tenth of one inch below the water surface. Of course, when the bait is urged through the water by the application of an inclined pull to the lure this depth will increase. Thus, when urged along the surface of the water the body 10 is submerged sufficiently to permit the rotation of the propellor 43 and shaft 22. The crank shaft 22 engages and induces oscillation into the leg means 20 and 21 in simulation of live bait. The leg means 20 and 21 are not attached positively to the propellor driven crank shaft 22 and because of this it is a relatively simple matter to replace said leg means and substitute others.

Figure 10:
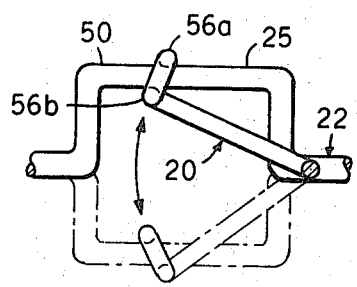
FIG. 10 is an enlarged detail illustrating engaging portions of the shaft and legs of the species of FIG. 6.
Figure 11:
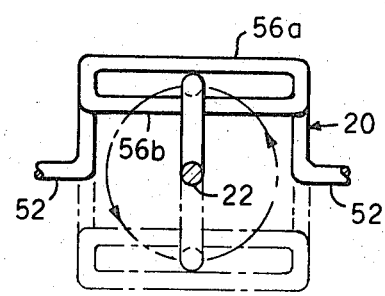
FIG. 11 is an end view of said engaging portions.

As shown in FIG. 2 the crank portions of the shaft 22 are oppositely oriented, although not necessarily at 180° to each other, and move the legs up and down in opposite directions, the timing being controlled by the angle of offset. When the lure is used as a surface active bait the leg means 20 and 21 are not completely submerged and the weight distribution of the depending portions of the leg means 20 tends to urge them downwardly about their transverse journal axis under their own weight. The leg means are lifted by engagement with the associated orbiting portion of the crank shaft 22 until top dead center is reached following which the legs tend to fall under gravity. In some instances, for example when the ends of the leg means are subject to substantial drag by immersion in water, it is advisable to assist this downward movement. This can occur even when the lure is used as a surface active bait but is more likely to be required when the lure is used as subsurface active bait. In order to assist downward movement and ensure continuity of engagement between the crank shaft 22 and the leg means 20 and 21, a modification of the leg structure may be provided as shown in FIGS. 6, 10 and 11 in which offset elements 56a and 56b, are urged upwardly and downwardly respectively by the orbiting offset portion 50.

The upper and lower body portions 11 and 12 respectively are held together by snap rings 13 which require a specific force of about 40 pounds to disengage them. Each of the snap rings has sufficient holding power to hold the body together when the other is removed. Thus, even though one snap ring is pulled from the body as a result of the snagging of the attached hook 17, the other ring will hold the body together.

I claim as my invention:

1. A fishing lure comprising:
   a. a body including opposed ends,
   b. longitudinal shaft means mounted in journal relation to the body and including:
      1. an axial portion rotatable about the longitudinal journal axis, and
      2. an orbitable portion disposed within the body in offset relation to said journal axis and orbital about said journal axis,
   c. drive means operatively rotating the longitudinal shaft means, and
   d. transverse shaft means mounted in journal relation to the body and including:
      1. an axial portion rotatable about the transverse journal axis,
      2. an oscillatable portion disposed within the body in offset relation to said journal axis and engaging under only gravity the orbitable portion of the longitudinal shaft means for oscillation about the transverse journal axis, the oscillatable portion being spaced from the longitudinal journal axis a distance greater than the orbital radius of the orbitable portion of the longitudinal shaft means to preclude interference,
      3. at least one end portion extending outwardly of the body in angular relation to said journal axis, and
      4. the center of gravity of the transverse shaft means is offset from its journal axis in the same direction as the oscillatable portion whereby the oscillatable portion is urged downwardly under gravity until raised by the orbitable portion of the longitudinal shaft means.

2. A fishing lure comprising:
   a. a body including opposed ends,
   b. longitudinal shaft means mounted in journal relation to the body and including:
      1. an axial portion extending outwardly of one end of the body and rotatable about the longitudinal journal axis, and
      2. an orbitable portion disposed within the body in offset relation to said journal axis and orbitable about said journal axis, and
   c. propellor means attached to said axial portion and operatively rotating the longitudinal shaft means, and
   d. transverse shaft means mounted in journal relation to the body and including:
      1. opposed axial portions rotatable about the transverse journal axis,
      2. an intermediate oscillatable portion disposed within the body between said axial portions in offset relation to said journal axis and engaging under only gravity the orbitable portion of the longitudinal shaft means for oscillation about the transverse journal axis, the oscillatable portion being spaced from the longitudinal journal axis a distance greater than the orbital radius of the orbitable portion of the longitudinal shaft means to preclude interference,
      3. opposed end portions extending outwardly of the body in angular relation to the journal axis, and
      4. the center of gravity of the transverse shaft means is offset from its journal axis in the same direction as the oscillatable portion whereby th oscillatable portion is urged downwardly under gravity until raised by the orbitable portion of the longitudinal shaft means.

3. A fishing lure as defined in claim 2, in which:
   e. the body includes separable upper and lower portions, and
   f. the transverse shaft means is mounted between said portions and the oscillatable portion is disposed above said orbitable portion to facilitate lifting removal of and subsequent replacement of said transverse shaft means without disturbing the longitudinal shaft means.

4. A fishing lure as defined in claim 2, in which:
   e. the body includes separable upper and lower portions,
   f. snap ring means holds said body portions together, said snap ring means including a plurality of spaced snap rings at least one of said which resiliently embraces the body portions and is removable upon application of sufficient force, the remaining snap ring means having a capability of holding said body portions together, and
   g. a hook is connected to the said removable snap ring through which the force is applied when the hook is snagged.

* * * * *